United States Patent
Schmickl et al.

(10) Patent No.: US 6,199,817 B1
(45) Date of Patent: Mar. 13, 2001

(54) DEVICE FOR MOUNTING A LIGHTING UNIT ON A VEHICLE PART

(75) Inventors: Klaus Schmickl, Reutlingen; Dietmar Schoenettin, Hepberg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/296,732

(22) Filed: Apr. 22, 1999

(30) Foreign Application Priority Data

Jun. 19, 1998 (DE) ......................................... 298 10 988 U

(51) Int. Cl.[7] ....................................................... A47F 7/14
(52) U.S. Cl. ................................... 248/475.1; 280/728.2; 362/459; 362/507
(58) Field of Search ........................ 248/475.1; 280/727, 280/728.2; 362/459, 487, 509, 506, 507, 549

(56) References Cited

U.S. PATENT DOCUMENTS

| | | | |
|---|---|---|---|
| 4,747,023 | * 5/1988 | Ball et al. | 362/66 |
| 5,735,591 | * 4/1998 | Ruckwied | 362/61 |
| 5,975,729 | * 11/1999 | Dobler et al. | 362/507 |
| 5,975,733 | * 11/1999 | Gonzalez Gallegos et al. | 362/549 |
| 6,129,448 | * 10/2000 | Takasaki et al. | 362/543 |

FOREIGN PATENT DOCUMENTS

| | | | |
|---|---|---|---|
| 3305 169 C1 | * 7/1984 | (DE) | 362/507 |
| 195 19 651 A1 | 12/1996 | (DE) . | |
| 3442 042 A1 | * 11/2000 | (DE) | 362/507 |
| 58-183327 | * 10/1983 | (JP) | 362/507 |

* cited by examiner

Primary Examiner—Ramon O Ramirez
Assistant Examiner—Walter Landry
(74) Attorney, Agent, or Firm—Michael J. Striker

(57) ABSTRACT

A locking element (30) is arranged slidable between an unlocked position and locked position on the lighting unit (10). An operating element (58) is rotatably mounted on the lighting unit (10). The operating element (58) is coupled with the locking element (30) by means of an eccentrically mounted finger (69) on it, so that a rotational motion of the operating element (58) is converted into a sliding motion of the locking element (30). A pin (20) is arranged on the vehicle part (12) on which the locking element (30) is lockable for securing the lighting unit (10). The operating element (58) allows the locking element (30) to be locked on the pin (20) when it is not directly accessible.

13 Claims, 4 Drawing Sheets

FIG. 2

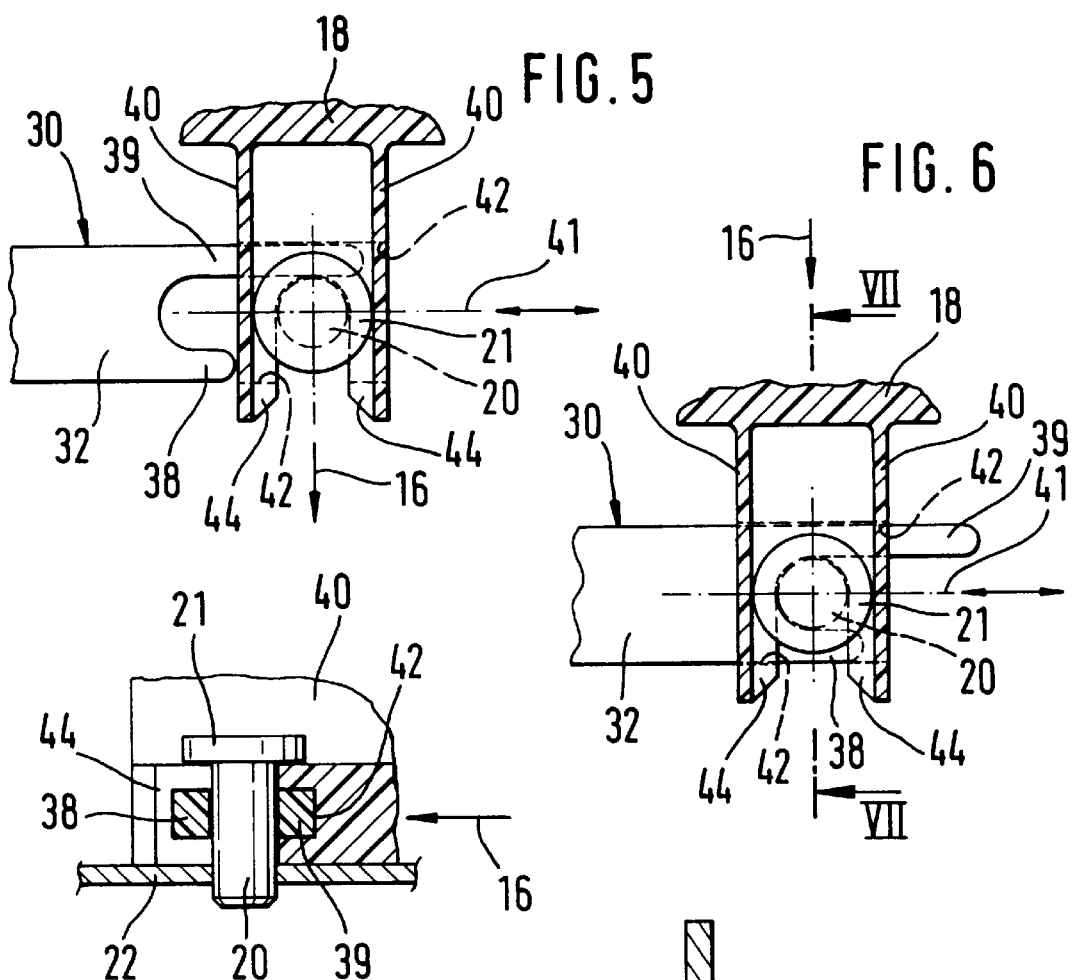
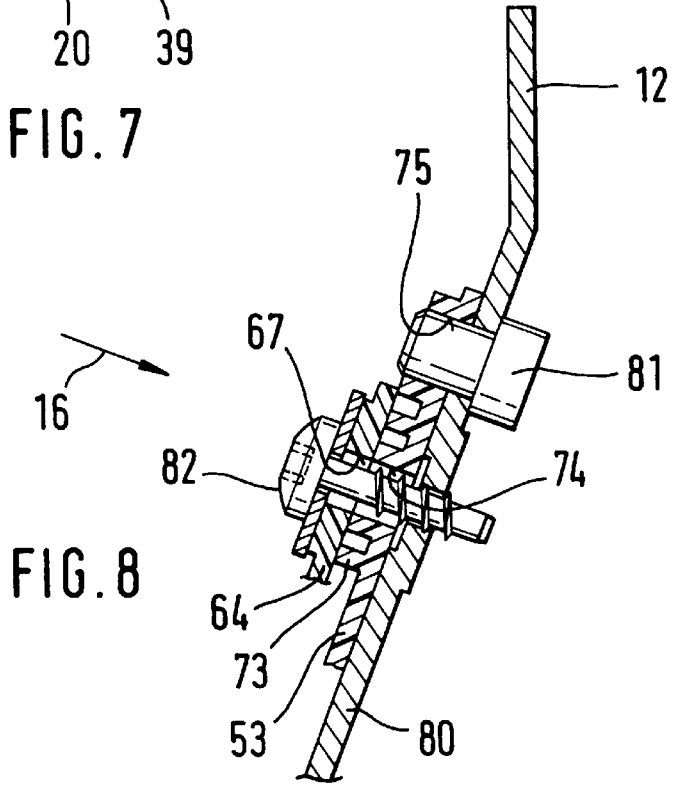

DEVICE FOR MOUNTING A LIGHTING UNIT ON A VEHICLE PART

BACKGROUND OF THE INVENTION

1. Field of the Invention

The present invention relates to a device for mounting a light or lighting unit on a vehicle component or part.

2. Prior Art

A mounting device of this general type is described in German Patent Document DE 195 19 651 A1. This device has a holding element arranged on a vehicle part. A locking element movable between an unlocked position and a locked position is arranged in the lighting unit. The lighting unit is inserted in a mounting direction on the vehicle part with the locking element in its unlocked position. Subsequently the locking element is moved into its locked position, whereby it locks in the holding element of the vehicle part, so that the lighting unit is held on the vehicle part. In this known device it is disadvantageous that the locking element itself must be directly accessible in order to lock or unlock it from the holding element of the vehicle part. This is not always possible due to the stringent installation conditions for the lighting unit, so that the arrangement of the holding element is difficult.

SUMMARY OF THE INVENTION

It is an object of the present invention to provide an improved device for mounting a light or lighting unit on a vehicle component or part of the above-described type, which does not have the above-described disadvantage.

This object, and others which will be made more apparent hereinafter, are attained in a device for mounting a lighting unit on a vehicle part comprising a holding element arranged on the vehicle part, a locking element arranged on the lighting unit and means for mounting the locking element between the lighting unit and the vehicle part so that the locking element is movable between a locked position and an unlocked position, whereby the lighting unit can be put on the holding element by moving the lighting unit in a mounting or insertion direction when the locking element is in the unlocked position, and wherein the locking element is movable transversely to the mounting direction into the locked position to secure the lighting unit on the vehicle part and lock the lighting unit on the holding element of the vehicle part.

According to the invention an operating element is rotatably mounted on the lighting unit and pivoting means for rotatably coupling the operating element with the locking element are provided, whereby a rotational motion of the operating element is converted into a translational or sliding motion of the locking element between the unlocked position and locked position.

The apparatus for attaching or mounting a lighting unit on a vehicle part or component according to the invention has the advantage that the locking element need not be directly accessible in order to move it from its unlocked to locked position and vice versa, since its motion between its unlocked and its locked positions can occur by means of an operating element. The structure of the operating element can be selected so that it is sufficiently accessible considering the respective installation conditions. Only a comparatively small amount of space is required for its rotational motion.

Various features of the preferred embodiments are set forth in the description and claims appended hereinbelow.

A particularly simple means for rotatably coupling the operating element for converting the rotational motion into a translational motion of the locking element is provided in an embodiment in which the pivoting means includes a finger arranged on the operating element eccentric to a rotational axis of the operating element and means for coupling this finger with the locking element, when the locking element moves in a longitudinal motion direction thereof. A balancing of motion perpendicular to the longitudinal motion direction of the locking element that occurs during rotational motion of the operating element can be obtained when the locking element is provided with a receptacle in which the finger of the operating element is freely slidable perpendicular to the longitudinal motion direction of the locking element.

The locking element is reliably guided in its motion when it is guided slidably on the lighting unit in the longitudinal motion direction between the unlocked position and the locked position.

In preferred embodiments of the invention the holding element is shaped like a pin or peg so as to provide a simple structure or device for locking the locking element on the holding element.

A reliable, easy assembly is guaranteed in preferred embodiments in which the lighting unit is provided with an opening in which the holding element is insertable when the lighting unit is mounted by a motion in the mounting direction and in which the holding element is received with slight play transverse to the mounting direction.

BRIEF DESCRIPTION OF THE DRAWING

The objects, features and advantages of the invention will now be illustrated in more detail with the aid of the following description of the preferred embodiments, with reference to the accompanying figures in which:

FIG. 2 is a simplified schematic view of the embodiment of the device shown in FIG. 1 in the direction of the arrow II in FIG. 3;

FIG. 5 is a cutaway longitudinal cross-sectional view of the lighting unit taken along the section line V—V in FIG. 1 with the locking element in the unlocked position;

FIG. 6 is a cutaway longitudinal cross-sectional view of the lighting unit taken along the section line V—V in FIG. 1 with the locking element in the locked position;

FIG. 7 is a cutaway cross-sectional view of the lighting unit taken along the section line VIII—VIII in FIG. 6; and FIG. 8 is a schematic cross-sectional view of the lighting unit taken along the section line VIII—VIII in FIG. 2.

DESCRIPTION OF THE PREFERRED EMBODIMENTS

Figure 1:
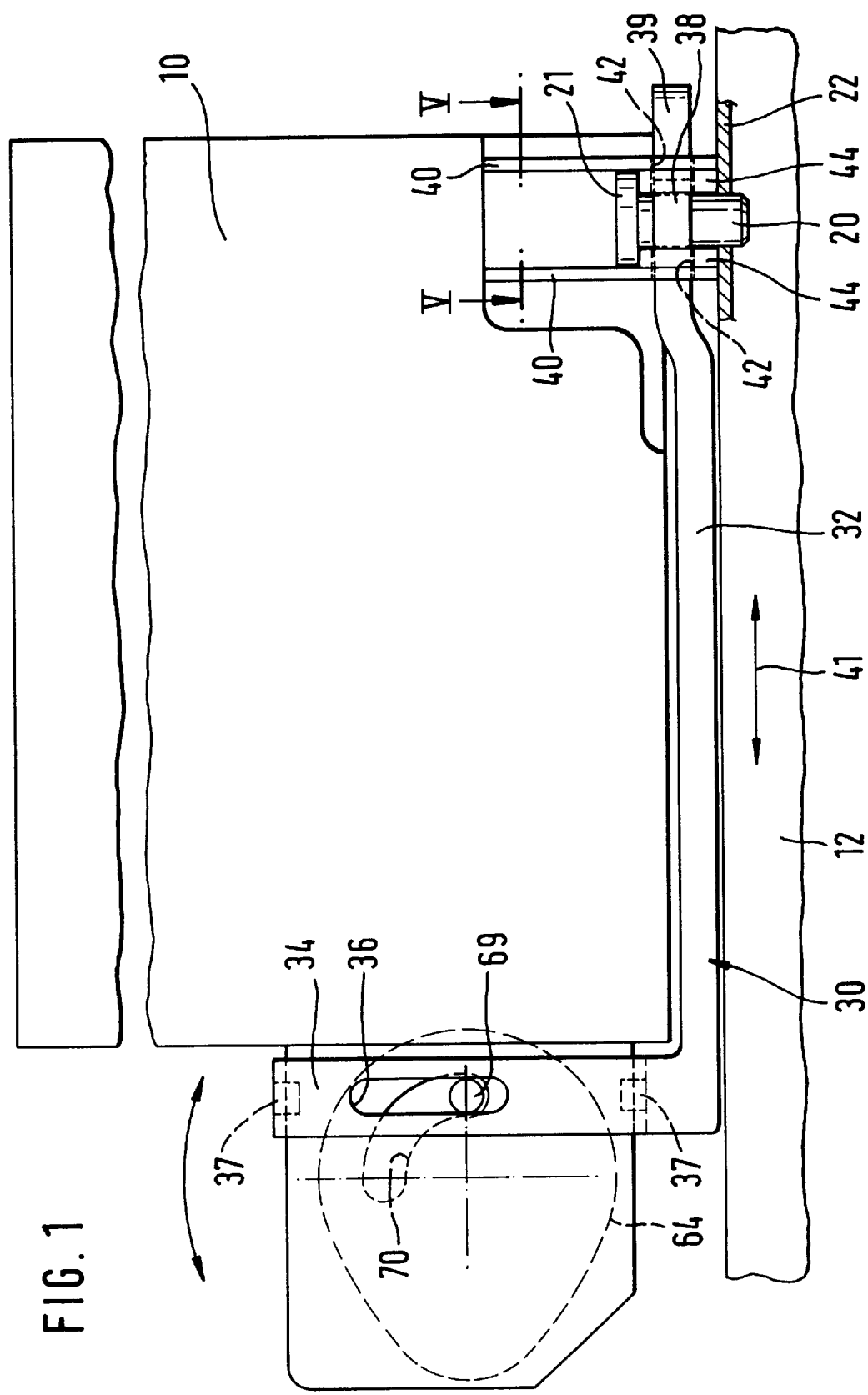
FIG. 1 is a simplified schematic view of one embodiment of a device for mounting a lighting unit according to the invention in the direction of the arrow I in FIG. 3.

A lighting unit 10 is shown in FIGS. 1 to 8, which is mounted on a vehicle part 12. The lighting unit 10 can be a headlight, a light or a headlight unit and particularly a motor vehicle headlight, light or headlight unit. The vehicle part 12 can be a chassis part or otherwise a front part of the vehicle. The vehicle part 12 has a receptacle for the lighting unit 10 in which the lighting unit 10 is inserted in a mounting or assembly direction 16 according to FIGS. 5 to 7. For example, the mounting direction 16 of the lighting device 10 can be from the front side of the vehicle opposite to the travel direction and approximately parallel to a longitudinal axis of the vehicle. The lighting unit 10 is provided with a housing 18, in which one or more reflectors and one or more light sources associated with them can be accommodated. However the reflectors and light sources are not shown in the drawing.

A pin 20 for the lighting unit 10 is arranged on the vehicle part 12 in the receptacle close to a lateral edge on its underside. This pin 20 is approximately vertical or is inclined and extends at least approximately perpendicular to the mounting direction of the lighting unit 10. The pin 20 can be made of metal or plastic material and be in one piece with the vehicle part 12 or it can be a separate part. In the embodiment shown in the drawing the pin 20 is connected with an approximately horizontally extending wall 22 of the vehicle part 12, for example by pressing or screwing one of its ends in the wall 22. The pin 20 has a head 21 with an enlarged cross-section on its free end.

Figure 2:
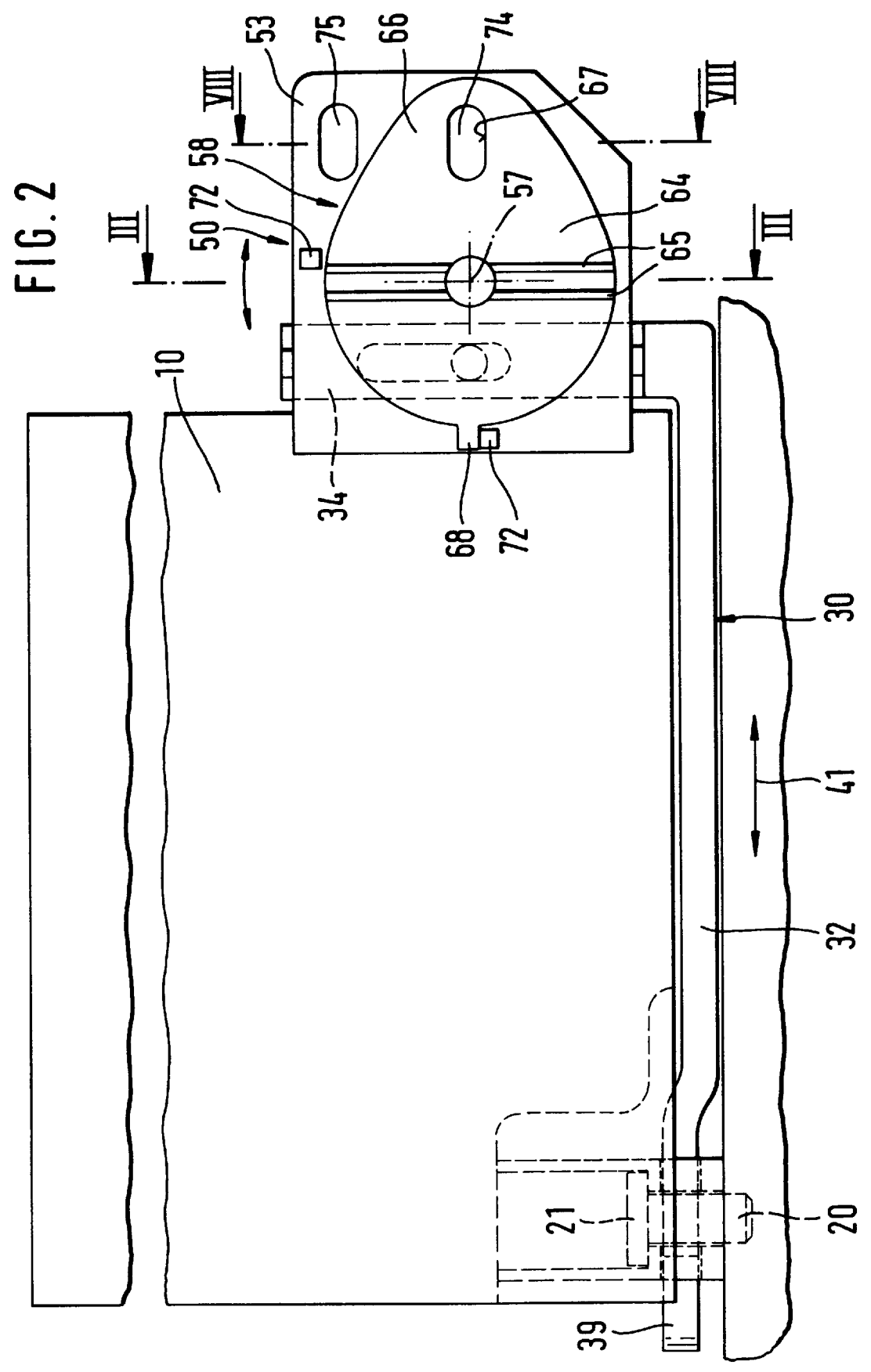
Figure 3:
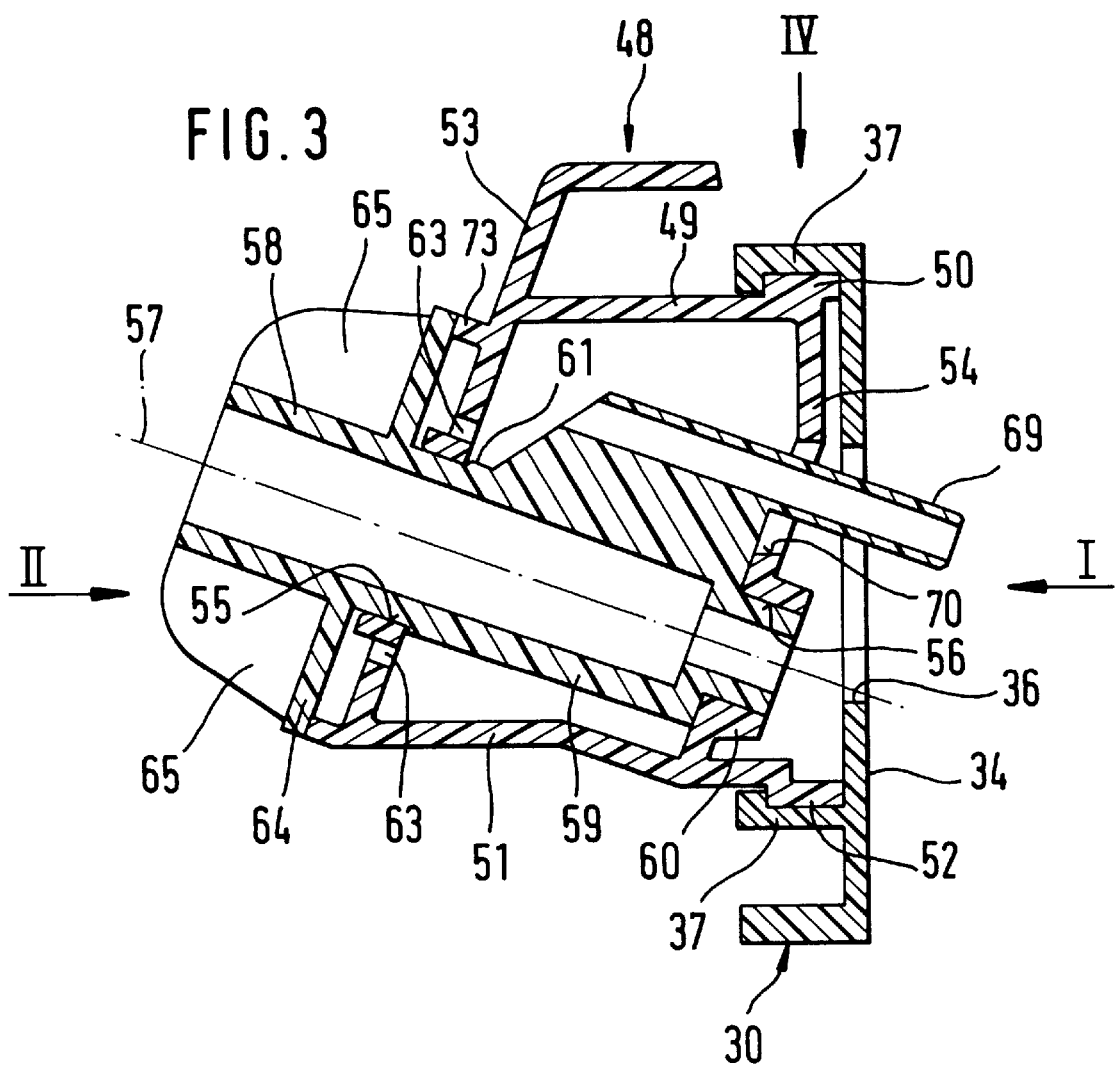
FIG. 3 is a schematic cross-sectional view of the lighting unit taken along the section line III—III in FIG. 2.
Figure 4:
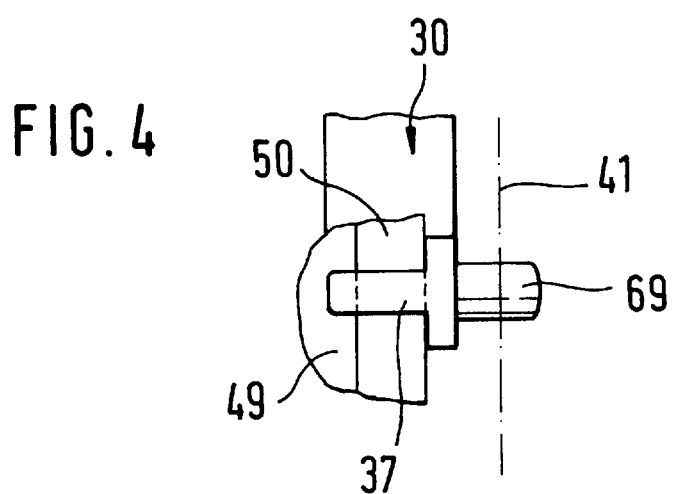
FIG. 4 is a cutaway view of a portion of the lighting unit in the direction of the arrow IV in FIG. 3.

A locking element 30 is arranged on the outer side of the housing 18 of the lighting unit 10. In the illustrated embodiment shown in FIGS. 1 and 2 the locking element 30 has a rod-like first section 32 extending over almost the entire width of the housing 18 on the underside of the housing 18. The rod-like first section 32, for example, has an approximately rectangular cross-section. The first section 32 is arranged so that its greater extent is in the horizontal direction. Because of the arrangement of the first section 32 under the housing 18 of the lighting unit 10 only a reduced structural height is required for it. An approximately vertically extending second section 34 pointing upward is connected in one piece on one end of the first section 32 of the locking element 30. For that reason the locking element is L-shaped. An elongated hole 36 is provided in the second section 34 extending in the longitudinal direction. Respective L-shaped hooks 37 are formed at the upper and lower edges of the second section 34 and project from it as shown in FIG. 3. The free end of the upper hook 37 extends downward and the free end of the lower hook 37 extends upward.

The first section 32 of the locking element 30 opposite to the second section 34 has a forked end portion as shown in FIGS. 5 and 6. The fork prongs 38, 39 of the forked end portion extend at least approximately parallel to the longitudinal extent of the first section 32 and are spaced from each other in the assembly direction 16. The fork prong 38 further in the mounting direction 16 is shorter than the other fork prong 39. The first section 32 of the locking element 30 can have an elbow at its fork-shaped end portion as shown in FIGS. 1 and 2, so that the forked end portion of the first section 32 is somewhat higher than the remaining portion of the section 32. The locking element 30 is preferably made from plastic and is made in one piece by injection molding.

The housing 18 of the lighting unit 10 has two walls 40 spaced from the section 32 and from each other in the longitudinal direction of the section 32 of the locking element 30 on its rear side in the region in which the forked end portion of the locking element 30 is arranged, as is shown in FIGS. 5 and 6. The walls 40 have respective slot-like openings 42 near their lower ends, through which the forked end portion of the locking element 30 passes. The walls 40 have enlarged edge portions 44 pointing toward each other near their lower ends, in the vicinity in which the openings 42 are formed, so that the spacing between the walls 40 is reduced somewhat their. The enlarged edge portions 44 taper in the mounting direction 16 toward the ends of the walls 40 and toward the mounting direction 16. The ends of the edge portions 44 formed on the housing 18 are connected with each other, so that the opening between the walls 40 is U-shaped. The forked end portion of the locking element 30 passes through the opening 42 of the walls 40 in the housing 18 with a little play so that the locking element 30 is guided slidably in the direction of the longitudinal axis 41 of the opening 42. The longitudinal motion direction 41 of the locking element 30 is parallel to its longitudinal axis.

A bracket 48 protrudes from the housing 18 as shown in FIG. 3 near the second section 34 of the locking element 30. It has an upper wall 49 on which a strip 50 is formed. The strip 50 extends in the longitudinal motion direction 41 of the locking element 30 and points upward, at least approximately parallel to the long axis of the opening 42. The bracket 48 has a lower wall 51, on which a strip 52 pointing downward is formed in the same way. The hooks 37 of the section 43 engage the respective strips 50 and 52, so that the locking element 30 is guided slidably by means of its hooks 37 sliding along the strips 50 and 52. The bracket 48 has two opposing walls 53, 54 arranged spaced from each other, which have respective throughgoing openings 55 and 56 coaxial to each other. The opening 56 in the front wall 54 adjacent to the second section 34 of the locking element 30 has a smaller diameter than the opening 55 on the back wall 53. An operating element 58 is mounted so that it is rotatable about the axis 57 in the openings 55 and 56 in the opposing walls 53 and 54. The operating element 58 is inserted in the openings 55,56 from the end remote or furthest from the second section 34. The operating element 58 has a pin 59 that is inserted through the openings 55, 56. The pin 59 has a smaller diameter on its front end and is supported there in a bearing sleeve 60 around the opening 56 of the front wall 54 next to the section 34 of the locking element 30. The section or portion of the pin 59 between the opposing walls 53,54 has one or more enlarged sections 61, whereby its diameter is somewhat greater there than the diameter of the opening 55. The opening 55 is somewhat resiliently expandable, which can be provided for example by a throughgoing circumferential opening 63 in the back wall 53 extending around the opening 55. The operating element 58 has a head 64 in one piece with the pin 59, which has a substantially larger cross-section than the pin 59 and which is arranged on the side of the back wall 53 facing away from the front wall 54. The head 64 of the operating element 58, for example, has two cross-members 65 spaced from each other and extending transversely over it, which can be gripped to manually rotate the operating element 58. The head 64 of the operating element 58 can have an essentially round cross-section, but with a cam-like peripheral protruding portion 66. The protruding portion 66 has an elongated throughgoing opening 67 extending in a radial direction. A nose 68 extends from the head 64 in a radial direction opposite to the protruding portion 66. The operating element 58 is shown in FIG. 3 in its unlocked position.

A finger 69 arranged eccentric to the rotation axis 57 of the operating element 58 is formed on the pin 59 of the operating element 58 arranged between the opposing walls 53, 54. The front wall 54 has a throughgoing passage 70 in addition to the opening 56, which is shaped like a section of a circular arc coaxial to the rotation axis 57 and through which the finger 69 extends. The throughgoing passage 70 extends above and next to the opening 56 of the front wall 54 to the housing 18. The finger 69 engages in the opening 36 of the section 34 of the locking element 30. The opening 55 in the front wall 53 has a lateral widening for passage of the finger 69. The operating element 58 is preferably made from plastic material is made in one piece by injection molding methods.

The back wall 53 of the bracket 48 of the housing has two projections 72 spaced from each other at an angle of 90° with respect to the rotation axis 57 of the operating element 58 on its side facing away from the front wall 54 as shown in FIG. 1. On this side the back wall 53 has a collar 73 spaced from the opening 55 as shown in FIG. 3. An opening 74 formed as an elongated hole extending in a radial direction is provided in the back wall 53 adjacent to the opening 55 with approximately the same radial spacing from the rotation axis 57 as the elongated hole 67 in the protruding portion 66 of the head 64 of the operating element 58. The elongated hole 74 is arranged approximately laterally to the opening 55 in a horizontal direction. An additional elongated hole 75 is provided in the back wall 53 above the elongated hole 74, which similarly extends approximately horizontally.

The operating element 58 is mounted in the housing 18 of the lighting unit 18, when its pin 59 is inserted through the opening 55 of the front wall 53, whereby the finger 69 can protrude through the widened cross-section of the opening 55. The end of the pin 59 protrudes through the opening 56 of the front wall 54 and into the bearing sleeve 60. The finger protrudes through the opening 70. The opening 55 is widened by deforming the edge of the throughgoing circumferential opening 63 by passage of the portion of the pin 59 with the enlarged section 61 through the opening 55 of the back wall 53. When the enlarged section 61 passes through the opening 55, the edge of the opening 55 is pushed back and the operating element is securely grasped in the back wall 53, so that it cannot be pulled out again in the direction of its rotation axis 57.

The locking element 30 is mounted in the housing 18, when its fork-like end is inserted in the opening 42 of the walls 40 of the housing 18. Both hooks 37 of the locking element 30 are hung up or positioned by means of the strips 50, 52 and the finger 69 of the operating element 58 is inserted in the opening 36 of the section 34 of the locking element 30. The locking element 30 is then guided slidably in its longitudinal motion direction 41 on the strips 50,52 and then into the opening 42 in the housing 18. The locking element 30 is slidable between an unlocked position, which is the left side according to the representation in FIG. 1, and a locked position that is on the right side according to the representation in FIG. 1. A motion of the locking element 30 between its unlocked position and its locked position in the longitudinal motion direction 41 is possible by means of a rotation of the operating element 58 about its rotation axis 57, which is converted into the longitudinal motion of the locking element 30 by means of the finger 69 engaging in the opening 36 of the locking element 30. The motion of the finger 69 in a vertical direction occurring on rotation of the operating element 58 is compensated by the opening 36 formed as an elongated throughgoing hole, in which the finger 69 is freely slidable in a vertical direction. In the position of the operating element 58 corresponding to the unlocked position of the locking element the nose 68 of head 64 finds itself in contact on the right projection 72 of the back wall 53 in a clockwise direction from it and in the position of the operating element 58 corresponding to the locking position of the locking element 30 the nose 68 of head 64 finds itself contacting the left projection 72 of the back wall 53 in a counterclockwise direction from it.

In FIG. 5 the locking element is illustrated in its unlocked position, in which the longer fork prong 39 protrudes through the walls 40, while the shorter fork prong 38 does not, so that an opening remains between the walls 40 in the vicinity of their edge portions 44. With the locking element 30 in its unlocked position according to FIG. 5 the lighting unit 10 is inserted in the mounting or insertion direction 16 into the receptacle of the vehicle part 12. The pin 20 on the vehicle part 12 can engage between the walls 40 in the vicinity of the enlarged edge portion 44 in the opening with reduced play and the lighting unit 10 can be inserted in the mounting direction 16 far enough until the pin 20 contacts the edge of the opening between the walls 40 or on the fork prong 39. The walls 40 with the enlarged edge portions 44 form a receptacle for the pin 20, which is insertable therein. The back wall 53 of the bracket 48 of the housing 18 of the lighting unit 10 comes into contact with the wall 80 of the vehicle part 12 in the final position of the housing 18 in the mounting direction 16 as shown in FIG. 8. A bolt 81, which enters the elongated hole 75, is arranged in the wall 80 extending approximately parallel to the mounting direction 16, whereby the lighting unit 10 is temporarily held and centered on the vehicle part 12. Subsequently the operating element 58 is rotated in a clockwise direction according to FIG. 2, until its nose contacts the left projection 72 of the back wall 53. Then the locking element 30 is pushed into its locked position according to FIG. 5, so that its short fork prong 38 engages between the walls 40 and behind the pin 20. The lighting unit 10 is fixed on the pin 20, which is fixed transversely to the mounting direction 16 in an approximately horizontal direction with little play in the opening between the walls 40 in the vicinity of their enlarged edge portions 44 and which is fixed by the fork prongs 38,39 engaging it in and opposite to the mounting direction 16. It can be provided that the housing 18 of the lighting unit 10 sits on the wall 22 of the vehicle part 12, whereby the head 21 of the pin 20 is arranged above the region of the walls 40 with the thickened edge portions 44, so that the housing 18 is also fixed in the direction of the longitudinal axis between the wall 22 and the head 21 of the pin 20.

In the rotated position of the operating element 58 corresponding to the locked position of the locking element 30 as shown in FIG. 2 its nose 68 contacts on the left projection 72 of the back wall 53 and the elongated hole 67 of the protruding portion 66 of the head 64 of the operating element 58 is aligned with the elongated hole 74 of the back wall 53. The wall 80 of the vehicle part 12 has an opening in the vicinity of the elongated holes 67 and 74 as shown in FIGS. 2 and 8, in which a securing element 82 in the form of a screw is turned into the opening or locked in the opening by means of clips. The operating element 58 is blocked in its rotational position corresponding to the locked position of the locking element by the securing element 82, so that it cannot be unintentionally rotated. Furthermore the lighting unit 10 is fixed in the vehicle part 12 by the securing element 82. Moreover one or more attaching points can be provided for the lighting unit 10, at which it can be secured by means of known attaching elements, such as screws, to the vehicle part 12. The above-described attaching points, which are formed by the pin 20 and the locking element 30 engaging it and the bracket 48 fixed by means of the attaching element 82, are arranged on the lower part of the lighting unit 10. At least one other attaching point is provided preferably on an upper portion of the lighting unit 10.

The disclosure in German Patent Application 298 10 988.3 of Jun. 19, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a device for mounting a lighting unit in a vehicle part, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A device for mounting a lighting unit (10) on a vehicle part (12), said device for mounting comprising
    a holding element (20) adapted for arrangment on said vehicle part (12),
    a locking element (30) arranged on the lighting unit (10),
    means for mounting the locking element (30) between the lighting unit (10) and the vehicle part (12) so that said locking element (30) is movable between a locked position and an unlocked position, whereby the lighting unit (10) can be put on the holding element (20) by moving said lighting unit (10) in a mounting direction (16) when the locking element (30) is in said unlocked position, and wherein said locking element (30) is movable transversely to the mounting direction (16) into said locked position for securing the lighting unit (10) on the vehicle part (12) and lock the lighting unit (10) on the holding element (20) of the vehicle part (12);
    an operating element (58) rotatably mounted on the lighting unit (10); and
    pivoting means (36,69) for rotatably coupling the operating element (58) with the locking element (3), whereby a rotational motion of the operating element (58) is converted into a translational motion of the locking element (30) between said unlocked position and said locked position.

2. The device as defined in claim 1, wherein said pivoting means (36,69) comprises a finger (69) arranged on said operating element (58) eccentric to a rotational axis of said operating element (58) and means for coupling said finger (69) with said locking element (30) for motion of said locking element in a longitudinal motion direction (41) thereof.

3. The device as defined in claim 2, wherein the locking element (30) has a receptacle (36) in which said finger (69) of said operating element (58) is freely slidable perpendicular to said longitudinal motion direction (41) of said locking element (30).

4. The device as defined in claim 3, wherein the operating element (58) is arranged spaced from the locking element (30) and the locking element (30) is securable to the holding element (20) of the vehicle part (12).

5. The device as defined in claim 3, wherein said locking element (30) is adapted to the guided slidably on said lighting unit (10) in said longitudinal motion direction between said unlocked position and said locked position.

6. The device as defined in claim 3, wherein said holding element (20) comprises a pin.

7. The device as defined in claim 6, wherein said locking element (30) is movable in a longitudinal motion direction (41), said locking element (30) has a forked end portion including fork prongs (38, 39) extending at least approximately parallel to said longitudinal motion direction (41) and transverse to the mounting direction (16) of the lighting unit (10).

8. The device as defined in claim 7, wherein the lighting unit (10) has an opening (40,44) in which said holding element (20) is insertable when said lighting unit (10) is mounted by a motion in said mounting direction (16) and in which said holding element (20) is received with slight play transverse to said mounting direction.

9. The device as defined in claim 8, wherein said forked end portion (38,39) of the locking element (30) is guided slidably through the opening (40,44) transverse to said mounting direction (16) of the lighting unit (10), whereby said opening (40,44) is closed by one (38) of said fork prongs (38,39) of the locking element (30) in said locked position of said locking element (30).

10. The device as defined in claim 8, wherein the opening (40,44) is closable by means of one (38) of the fork prongs (38,39) further in the mounting direction of the lighting unit (10) and said one (38) of said fork prongs (38,39) is shorter than another (39) of said fork prongs.

11. The device as defined in claim 8, wherein said locking element (30) has a first section (32) extending along an upper or lower side of the lighting device (10), the first section (10) is lockable on the holding element (20) arranged close to a side region of the lighting unit (10), and a second section (34) extending on a side region of the lighting device opposite from the holding element (20) and at an angle with respect to said first section (32), and further comprising means for coupling said second section (34) of said locking element with said operating element (58).

12. The device as defined in claim 1, further comprising a securing element (82) for fixing said operating element (58) to prevent rotation of said operating element, whereby said operating element (58) is only mountable in a rotational position corresponding to the locked position of the locking element (30).

13. The device as defined in claim 12, wherein said lighting unit (10) is fixed to said vehicle part (12) by said securing element (82).

* * * * *